US012779384B2

(12) United States Patent
Stillo, Jr. et al.

(10) Patent No.: US 12,779,384 B2
(45) Date of Patent: Nov. 3, 2026

(54) FILTER EXTENDER AND FILTER FOR MATING WITH SAME

(71) Applicant: Camfil AB, Stockholm (SE)

(72) Inventors: Andrew Stillo, Jr., West Caldwell, NJ (US); Joseph John Gorman, Oak Ridge, NJ (US); Michael Joseph Petroglia, Lebanon, NJ (US); Adam Sienkiewicz, Midland Park, NJ (US)

(73) Assignee: Camfil AB, Stockholm (SE)

(*) Notice: Subject to any disclaimer, the term of this patent is extended or adjusted under 35 U.S.C. 154(b) by 339 days.

(21) Appl. No.: 18/370,281

(22) Filed: Sep. 19, 2023

(65) Prior Publication Data

US 2024/0100456 A1 Mar. 28, 2024

Related U.S. Application Data

(60) Provisional application No. 63/409,512, filed on Sep. 23, 2022.

(51) Int. Cl.
*B01D 46/00* (2022.01)
*B01D 46/121* (2022.01)

(52) U.S. Cl.
CPC ....... *B01D 46/0005* (2013.01); *B01D 46/121* (2022.01); *B01D 2265/028* (2013.01)

(58) Field of Classification Search
CPC .............. B01D 46/0005; B01D 46/121; B01D 2265/028; B01D 46/0002; B01D 35/30; B01D 29/00; F16B 5/00; F16B 5/0012
See application file for complete search history.

(56) References Cited

U.S. PATENT DOCUMENTS

| | | | | |
|---|---|---|---|---|
| 6,264,713 | B1 * | 7/2001 | Lewis, II | B01D 46/521 55/502 |
| 6,461,396 | B1 * | 10/2002 | Barker | F24F 8/108 55/471 |
| 6,502,909 | B1 * | 1/2003 | Swilik, Jr. | B01D 46/10 312/263 |
| 6,797,028 | B2 | 9/2004 | Duffy | |
| 7,156,098 | B2 | 1/2007 | Dolezal et al. | |
| 9,161,667 | B2 | 10/2015 | Sobel | |
| D778,419 | S * | 2/2017 | Poindexter | D23/365 |
| 10,138,917 | B2 * | 11/2018 | Koch | F16B 5/01 |
| 2004/0148915 | A1 * | 8/2004 | Lipner | B01D 46/0002 55/495 |
| 2005/0022489 | A1 * | 2/2005 | Harden | B01D 46/58 55/481 |
| 2007/0204575 | A1 * | 9/2007 | Lisbona | B01D 46/10 55/495 |
| 2008/0184685 | A1 * | 8/2008 | Kempf | B01D 46/0005 55/497 |
| 2012/0103482 | A1 * | 5/2012 | Simmons | B01D 46/10 29/700 |
| 2012/0240535 | A1 | 9/2012 | Mann et al. | |
| 2013/0291502 | A1 * | 11/2013 | Gorman | F16L 23/16 277/616 |

(Continued)

FOREIGN PATENT DOCUMENTS

WO 2022136515 A1 6/2022

*Primary Examiner* — Dung H Bui
(74) *Attorney, Agent, or Firm* — Patterson + Sheridan, LLP

(57) ABSTRACT

A filter extender that comprises a quadrilateral tube is provided, along with an air filter configured to mate with the same.

21 Claims, 9 Drawing Sheets

(56) References Cited

U.S. PATENT DOCUMENTS

| | | | | |
|---|---|---|---|---|
| 2013/0305670 | A1* | 11/2013 | Bordin | F24F 13/18<br>55/385.2 |
| 2014/0096493 | A1* | 4/2014 | Kelmartin | F02C 7/052<br>55/482 |
| 2015/0075125 | A1* | 3/2015 | Porbeni | B01D 46/121<br>55/497 |
| 2015/0107199 | A1 | 4/2015 | Smith et al. | |
| 2015/0224434 | A1* | 8/2015 | Hedlund | B01D 46/521<br>55/482 |
| 2016/0038869 | A1 | 2/2016 | Krause et al. | |
| 2017/0282107 | A1* | 10/2017 | Hugues | B01D 46/0001 |
| 2017/0348624 | A1* | 12/2017 | Do | B01D 46/0005 |
| 2018/0147517 | A1* | 5/2018 | Kurita | B01D 46/10 |
| 2018/0340498 | A1* | 11/2018 | Nakao | G10K 11/172 |
| 2018/0353890 | A1* | 12/2018 | Alberternst | B01D 46/2414 |
| 2020/0101408 | A1* | 4/2020 | Brown | F24F 1/0073 |
| 2020/0164298 | A1* | 5/2020 | Drabek | H02K 11/05 |
| 2020/0238211 | A1* | 7/2020 | Lee | B01D 46/0013 |
| 2021/0069629 | A1* | 3/2021 | Varghese | B01D 46/4227 |
| 2021/0129067 | A1* | 5/2021 | Knight | B01D 46/10 |
| 2022/0233983 | A1* | 7/2022 | Carr | F24F 13/20 |
| 2023/0201751 | A1* | 6/2023 | Mok | B01D 46/0086<br>55/495 |
| 2023/0271126 | A1* | 8/2023 | Kim | B01D 46/0039<br>55/467 |
| 2024/0115984 | A1* | 4/2024 | Schuhmacher | B01D 46/10 |
| 2024/0123386 | A1* | 4/2024 | Choi | F24F 8/80 |
| 2024/0350961 | A1* | 10/2024 | Girondi | B01D 46/2411 |

* cited by examiner

FILTER EXTENDER AND FILTER FOR MATING WITH SAME

CROSS REFERENCE TO RELATED APPLICATION

This application claims priority to the U.S. Provisional Application No. 63/409,512, filed on Sep. 23, 2022 of which is incorporated herein by reference in its entirety.

BACKGROUND

Field of the Disclosure

Embodiments of the present disclosure generally relate to a filter extender and filter for mating with the same.

Description of the Related Art

An air filtration system enhances air quality by reducing impurities, such as dust, pollen, mold, and bacteria, from the air. The air filtration system has a holding frame for mounting an air filter. The air filter may be a bag air filter, a v-bank air filter, a deep pleat air filter or other type of air filter. In the case of a v-bank air filter, the v-bank air filter has a filter frame for supporting one or more pairs of filter elements arranged in a v-configuration (i.e., a v-bank). The filter elements are comprised of filtration media configured to remove air impurities. As air flows into the air filter and through the filter elements, the air impurities are captured by the v-banks filtration media.

Since the holding frames are permanently installed in a larger surrounding structure, such as an air duct of a building ventilation system, the filter assemblies are designed to be easily removed from the holding frames when needed for replacement. Specifically, the filter frame of the air filter is releasably coupled to the holding frame. When installed, the filter frame of v-bank air filter is coupled to the front end of the holding frame such that the v-banks for filtration media extend through and out of the back end of the holding frame.

In many air filtration systems, the space available behind the holding frame is limited, and may interfere with the v-banks for filtration media that extend out of the back end of the holding frame. For example, the back end of the holding frame may be located close to a wall, cooling coils, or a bend in an air duct, which can obstruct the v-banks extending out of the back end of the holding frame. Thus in such installations, the air filter must be either mounted backwards in the holding frame such that the v-banks for filtration media that extend out of the front end of the holding frame, or the v-bank air filter also requires an additional pre-filter on the inlet side, it must include structure that spaces the front of the air filter away from the front end of the holding frame such that less or none of the v-banks for filtration media extend out of the back end of the holding frame which would allow the attachment of a additional prefilter. And structures that space the front of the air filter away from the front end of the holding frame necessitate an air filter specifically designed for this purpose, which generally increases the cost of manufacturing and stocking due to the special design.

Therefore, there is a need for an improved air filter and associated components suitable for mounting the air filter in a holding frame of an air filtration system.

SUMMARY

A filter extender and air filter for mating with the same are provided. The filter extender is configured to enable an air filter to be mounted to a filter holding frame with less or none of the air filter extending through the holding frame. The filter extender is also suitable for use with air filters other than the air filter described herein. Similarly, the air filter described herein may be utilized with other filter extenders or without a filter extender.

A filter extender that comprises a quadrilateral tube is provided, along with an air filter configured to mate with the same.

In one example, a panel for filter extender is provided. the panel includes a first end having a male engagement feature, a second end having a female engagement feature, a back edge connecting the first and second ends, and a front edge connecting the first and second ends. A clip extends from the front edge in a direction away from the back edge. The clip is integral to the body of the panel. The entire clip is offset from a centerline bifurcating the first and second edges.

In another example, a filter extender is provided. The filter extender includes a first panel having a first end and a second end connected by front and back edges; a second panel having a first end and a second end connected by front and back edges; a third panel having a first end and a second end connected by front and back edges; and a fourth panel having a first end and a second end connected by front and back edges. Each first edge of the first, second, third and fourth panels have a clip extending from the front edge in a direction away from the back edge. The clip is integral to the body of the panel. The entire clip is offset from a centerline bifurcating the first and second edges.

In other example, the first, second, third and fourth panels are identical.

In other example, the first and second panels are identical, the third and fourth panels are identical, and the first and third panels are have different lengths.

In yet an example, a filter is provided. The filter includes one or more filter elements and a header. The header is attached to and surrounds the one or more filter elements. The header has a front side connected to a backside by sides. The each side has at a recess, where the entire recess is offset from a centerline bifurcating opposite sides of the header.

In still another example, the one or more filter elements comprise one or more v-banks.

BRIEF DESCRIPTION OF THE DRAWINGS

So that the manner in which the above recited features can be understood in detail, a more particular description of the embodiments briefly summarized above may be had by reference to the embodiments below, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Disclosed herein are a filter extender and an air filter configured to mate with the same. The filter extender is configured to engage with a holding frame, such as a Type-8 holding frame available from Camfil USA, Incorporated, located in Riverdale, NJ. It is contemplated that the filter extender can be adapted to engage with holding frames available from other manufactures. The filter extender is configured to space the air filter from the holding frame, such that a back end of the air filter will not protrude, or protrude as much, through the holding frame as would be the case if the filter extender was not utilized. Beneficially, the filter extender allows a greater variety of air filters to be utilized in the holding frame, particularly when space is limited in front of and/or in back of the holding frame.

The filter extender is configured to mate with the air filter in a manner that securely couples the filter extender and air filter together, thus preventing inadvertent disengagement which might allow the air filter to fall out of the filter extender and become damaged. Moreover, the filter extender includes a latch configured to engage a mating feature present on the side of a header of the air filter, which beneficially allows an uninterrupted surface on the face of the header that can more effectively accommodate an optional pre-filter. Furthermore, the latch is offset from the centerline of the filter extender such that the latch of one filter extender is clear of a latch of a neighboring filter extender when a plurality of filter extenders are utilized side-by-side in a grid of holding frames.

The filter extender is fabricated from four panels. The panels are able to be shipped flat and assembled on site, thereby reducing shipping costs. In some examples, each panel of the filter extender has male retaining features on one side and female retaining features on the opposite side. In this manner, four of the same panels may be secured together to form the filter extender, thus reducing the number of panels needed to be retained in stock. Furthermore, for filter extenders having a rectangular configuration, the filter extender may be fabricated using only two types of panels (i.e., 2 of the same panels on opposite sides of the extender, with the adjacent panels having different lengths).

Figure 1:
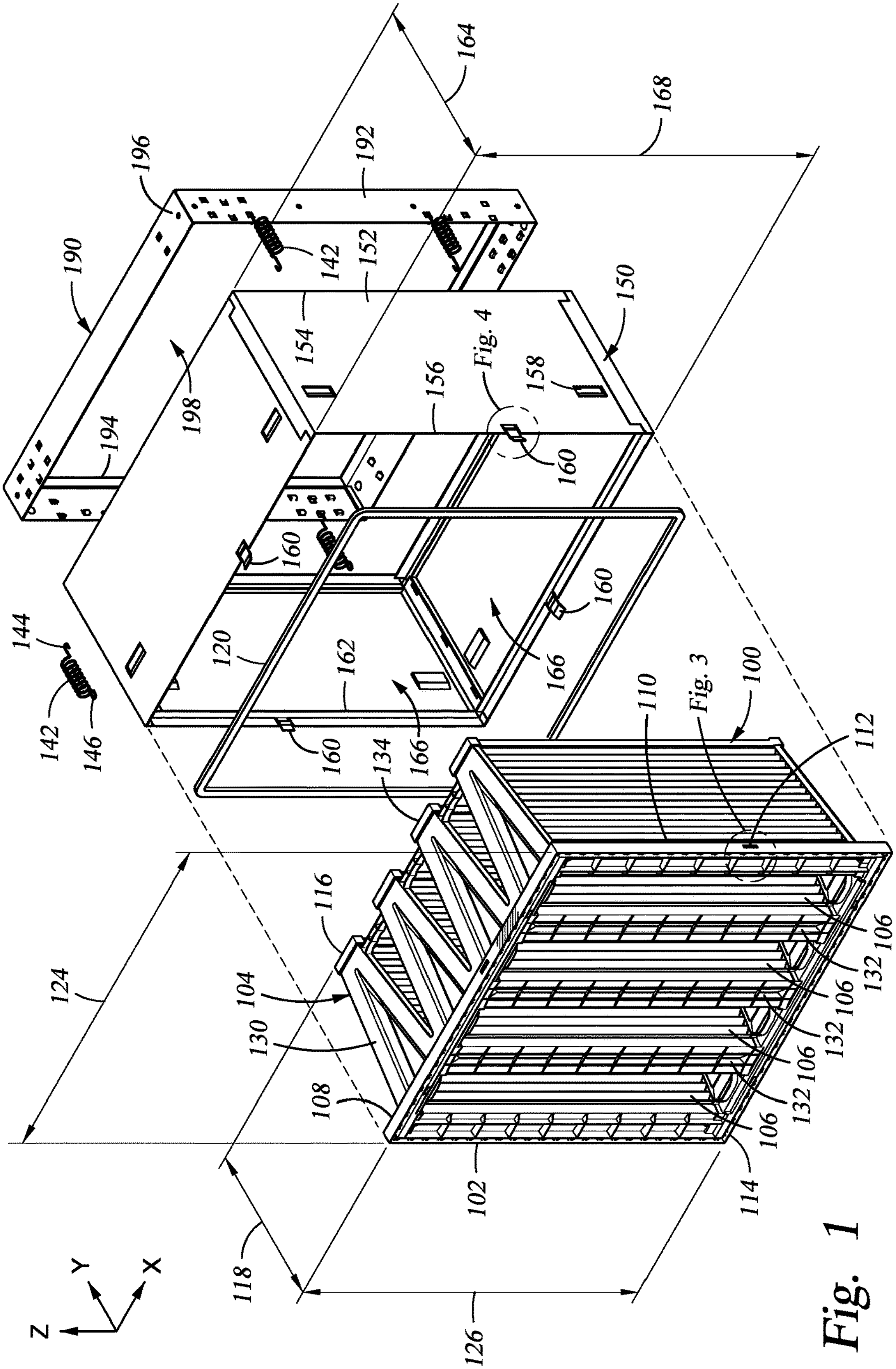
FIG. 1 illustrates a front perspective exploded view of an air filter, a filter extender, and a holding frame, according to embodiments disclosed herein.

Turning now to FIG. 1, a front perspective exploded view of an air filter 100, a filter extender 150, and a holding frame 190 are shown. At least a portion of the air filter 100 fits within an opening 166 of the filter extender 150, while at least a portion of the filter extender 150 fits within an opening 198 of the holding frame 190. An optional gasket 120 may be disposed between the air filter 100 and the filter extender 150 to reduce or eliminate air leaks therebetween when the air filter 100 is in use. The gasket 120 may optionally include a pressure sensitive adhesive to secure the gasket 120 to one of the air filter 100 or the filter extender 150.

The air filter 100 may be a bag air filter, a v-bank air filter, a deep pleat air filter or other type of air filter. The air filter 100 include one or more filter elements 106 connected to a frame or header 102. The filter element 106 may be a bag, pleated filter media, carbon pack or other type for filter element.

In example depicted in FIG. 1, the air filter 100 is configured as a v-bank filter having a plurality of v-banks 104 extending from a header 102. It is also contemplated that the air filter 100 may have a single v-bank 104. Each v-bank 104 includes to filter elements 106. The filter elements 106 may be fabricated from any type of suitable filtration media, such as but not limited to, carbon, wet laid glass, melt blown, and cellulose, among other types of filtration media.

The v-banks 104 are generally secured between two side panels 130, front channels 132 and back channels 134. Only the top side panels 130 is fully shown in FIG. 1, the bottom side panel disposed on the opposite side of the air filter 100. The channels 132, 134 generally extend between the side panels 130. The back channels 134 generally define the backside of the air filter 100, while the header 102 generally defines a front side 114 of the air filter 100. In operation, air enters the air filter 100 between the front channels 132, and passes through the filter elements 106 of each v-bank 104 before exiting out the backside 116 of the air filter 100 and passing through the holding frame 190.

The header 102 of the air filter 100 generally has a square or rectangular shape, with the top and bottom sides having a width 124 and a height 126. When the air filter 100 (and consequently the header 102) is not a square, the height 126 is less than the width 124. In some examples, the height 126 is about half the width 124. In other examples, the height 126 is greater than half the width 124 and less than the width 124, such as between 70 to 85 percent of the width 124. The v-banks 106 extend from the front side 114 of the header 102 a distance 118. The distance 118 may be less than, equal to, or greater than a depth 164 of the filter extender 150. In the example depicted in FIG. 1, the distance 118 is greater than the depth 164 of the filter extender 150, such that at least a portion of the backside 116 of the air filter 100 extends beyond a back edge 154 of the filter extender 150.

The header 102 of the air filter 100 also includes a backside 108, and sides 110. The sides 110 of the header 102 define the width 124 and height 126 of the air filter 100, which is generally slightly smaller than a width 168 of the opening 166 of the filter extender 150. As such, the header 102 is sized so that the sides 110 will extend inside a front edge 156 of the filter extender 150 and into the opening 166 until the backside 108 of the header 102 seats against a lip 162 of the filter extender 150 that projects into the opening 166. The lip 162 generally extends in a direction perpendicular to a plane defined by the exterior surface of the panel 152 that is bounded by the front and back edges 154, 156. The gasket 120 may optionally be disposed between the backside 108 of the header 102 and the lip 162 of the filter extender 150. The lip 162 does not extend into the opening 166 more than what is needed to seat the air filter 100, while remaining clear of the v-banks 104.

A blind recess 112 is formed on each side 110 of the header 102. Each blind recess 112 is formed in the same location on each side 110 of the header 102. The blind recess 112 is positioned to engage a clip 160 of the filter extender 150. The clip 160 may extend beyond the front edge 156 of the filter extender 150. The interface between the clip 160 and recess 112 is further described below.

Continuing to describe the filter extender 150, the filter extender 150 includes four panels 152 that are assembled to form a low profile rectangular tube that surrounds and defines the opening 166 through the filter extender 150. The panels 152 on opposite sides of the filter extender 150 are the same, and all four panels 152 being the same when the filter extender 150 is square. The opposing panels 152 of the filter extender 150 are same when the filter extender 150 is rectangular, with adjacent panels 152 being different.

As discussed above, the filter extender 150 has a back edge 154, a front edge 156. The front edge 156 faces the header 102, while the back edge 154 seats on a ledge 194 of the holding frame 190 upon insertion of the filter extender 150 into the holding frame 190. The header 102 of the air filter 100 seats against the backside 108 of the header 102 seats against a lip 162 extending from the front edge 156 of the filter extender 150.

The panels 152 of the filter extender 150 also include a plurality of blind recesses 158. The blind recesses 158 are configured to receive an end of a retaining clip. For example as depicted in FIG. 1, the blind recesses 158 are configured to receive a hook 146 formed at one end of a retaining clip 142. A hook 144 formed at the opposite end of the retaining clip 142 is configured to engage a hole 196 formed in the holding frame 190. The retaining clip 142 typically includes a spring that urges the filter extender 150 against the holding frame 190, thus preventing the filter extender 150 from inadvertently failing out of the holding frame 190. The blind recesses 158 are also configured to receive an end of a retaining clip configured to retain a pre-filter (not shown) against the front side 114 of the header 102 of the air filter 100. The number, shape, and geometry of the blind recesses 158 may be selected as desired.

Figure 2:
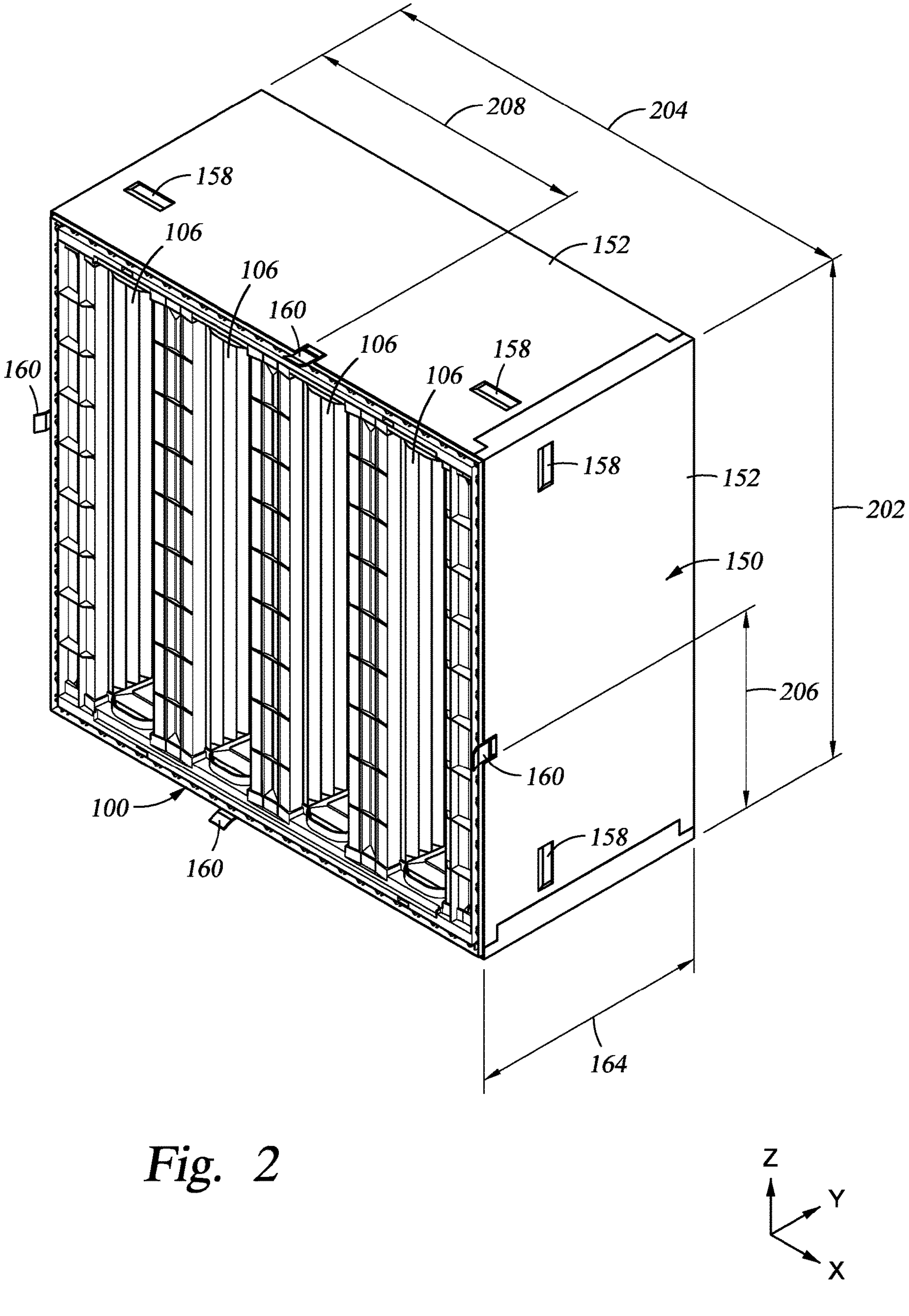
FIG. 2 illustrates a front perspective view of an air filter mounted in a filter extender.
Figure 5:
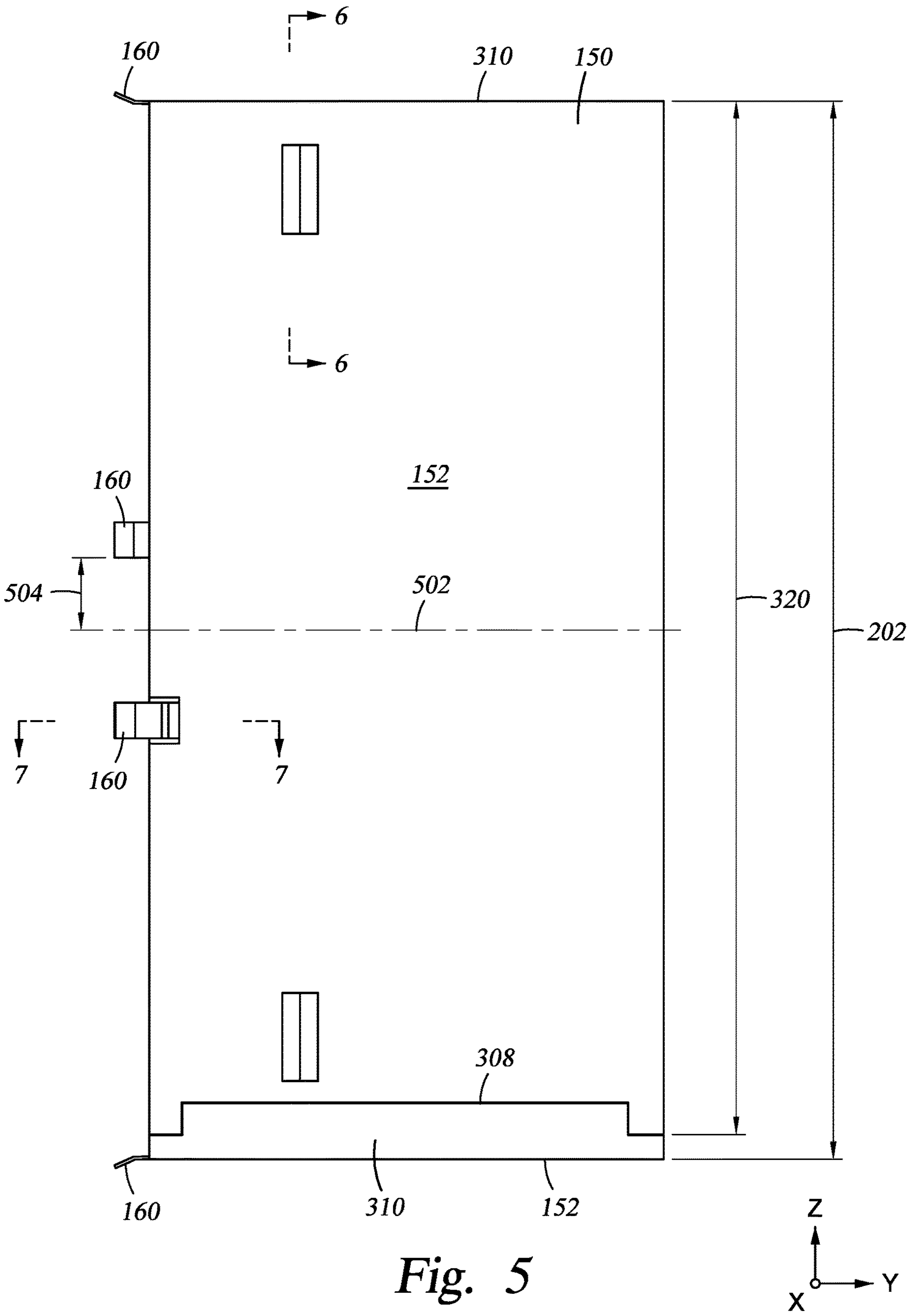
FIG. 5 illustrates a side view of a filter extender assembled using 4 panels.

FIG. 2 is a front perspective view of the air filter 100 mounted in the filter extender 150. In FIG. 2, the filter extender 150 has a depth 164, a height 202 and a width 204. The retaining clip 160 is located along each panel 152 a distance that is greater than half the height 202/width 204 of the panel 152. For example along panels 102 defining the height 202, the entire clip 160 is located a distance 206 that is greater than half the height 202. Similarly, along panels 102 defining the width 204, the entire clip 160 is located a distance 208 that is greater than half the width 204. Since panels 102 on opposite sides of the filter extender 150 are the same, the distance 206 is measured from the top of the filter extender 150 on one side of the filter extender 150, while the distance 206 is measured from the bottom on the opposite side of the filter extender 150. Similarly, the distance 208 is measured from left side of the filter extender 150 on one of the top or bottom of the filter extender 150, while the distance 206 is measured from the other of the top or bottom of the filter extender 150. The distances 206, 208 are the same for filter extenders 150 having square profiles or openings 166, and different for filter extenders 150 having rectangular profiles or openings 166. Since clips 160 on opposite sides of the filter extender 150 are completely offset 504 to different sides of the centerline 502 of the filter extender 150 as shown in FIG. 5, adjacent clips 150 on neighboring filter extenders 150 remain clear of each other when filter extender 150 are mounted side-by-side (and/or one on top the other) in a grid of holding frames 190.

Figure 3:
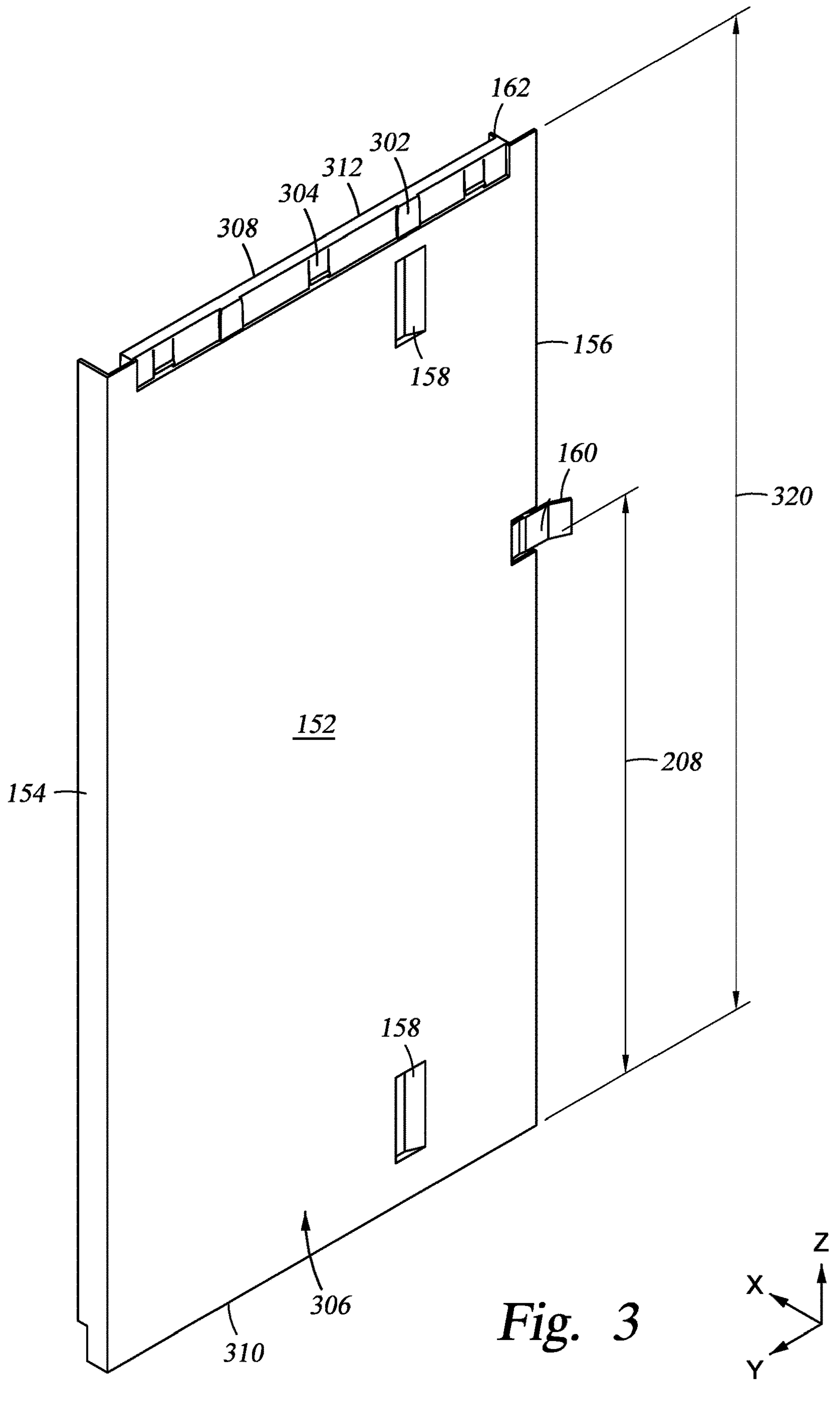
FIG. 3 illustrates a front perspective view of one panel of a filter extender.
Figure 6:
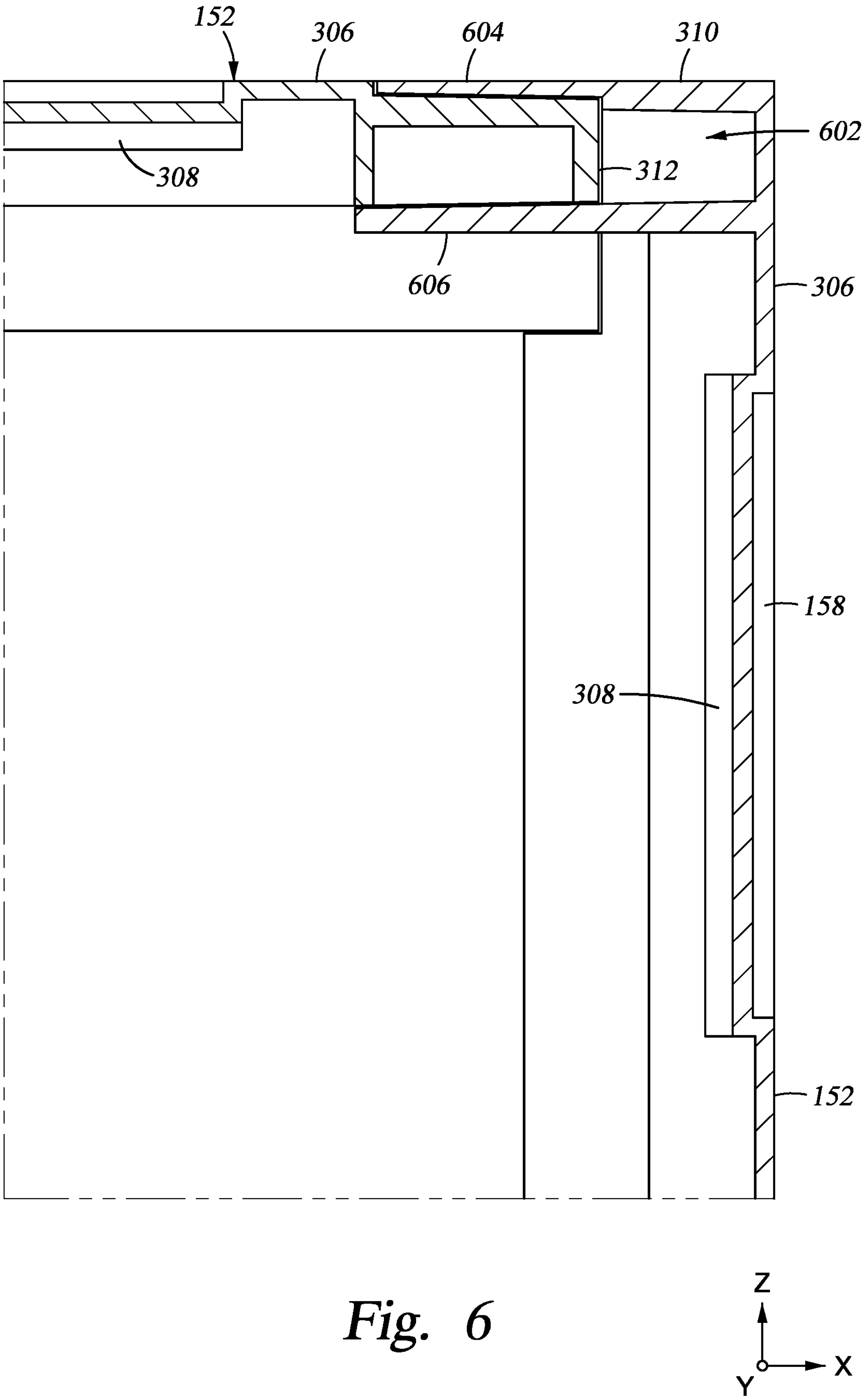
FIG. 6 illustrates a partial sectional view of a portion of one of the filter panels of the filter extender taken along section line 6-6 depicted in FIG. 5.

FIG. 3 is a front perspective view of one panel 152 of the filter extender 150. In one example, the panel 152 has a length 320 that is slightly less than the width 204 (or if a side of the filter extender 150, the height 202) of the filter extender 150. This is because a portion of one of the other panels 152 mating with one end of the panel 152 makes the assembled filter extender 150 longer than a single panel 152 (as also seen in FIG. 6). It is also contemplated that the length 320 of the panel 152 can be the same as the length 202 and/or width 204 of the filter extender 150. The distance 208 is also less than the length 320 such that the entire clip 160 is offset to one side of the centerline of the panel 152 that bifurcates the front and back edges 154, 156. In one example, the clip 160 and the panel 152 are fabricated as single contiguous mass of material, such as by injection molding. In another example, the clip 160 is attached to the panel 152, such as by rivets or another suitable technique.

The panel 152 depicted in FIG. 3 includes an outer facing side 306 and an inner facing side 308. The panel 152 additionally includes a first end 310 and a second end 312. The first end 310 of the any of the panels 152 comprising the filter extender 150 is configured to mate with any of the second ends 312 of the other panels 152 comprising the filter extender 150. In one example, the second end 312 mates with the first end 310 in a male/female relationship.

In the example depicted in FIG. 3, the male second end 312 includes a plurality of first retaining features 304. The first retaining features 304 are configured to engage with a plurality of second retaining features 404. The second retaining features 404 are shown in a back perspective view of the panel 152 illustrated in FIG. 4. In one example, the first retaining features 304 are configured as male engagement features, such as projections, that engage depressions that defines the second retaining features 404 (i.e., female engagement features). In this manner, the first retaining features 304 present on second end 312 of one panel 152 may snap fit with the second retaining features 404 present on first end 310 of an adjacent panel 152.

Optionally to ensure alignment and rigidity of the assembled filter extender 150, the first and second ends 310, 312 may include complimentary alignment features 302, 404. For example, the first alignment feature 302 formed in the second end 312 of the panel 152 may be a projection, such as a rib, key, or flat and the like, that mating engages with the second alignment feature 404 in the form of a complimentary slot, step, indent or the like, formed in the first end 310 of the adjacent panel 152.

Figure 4:
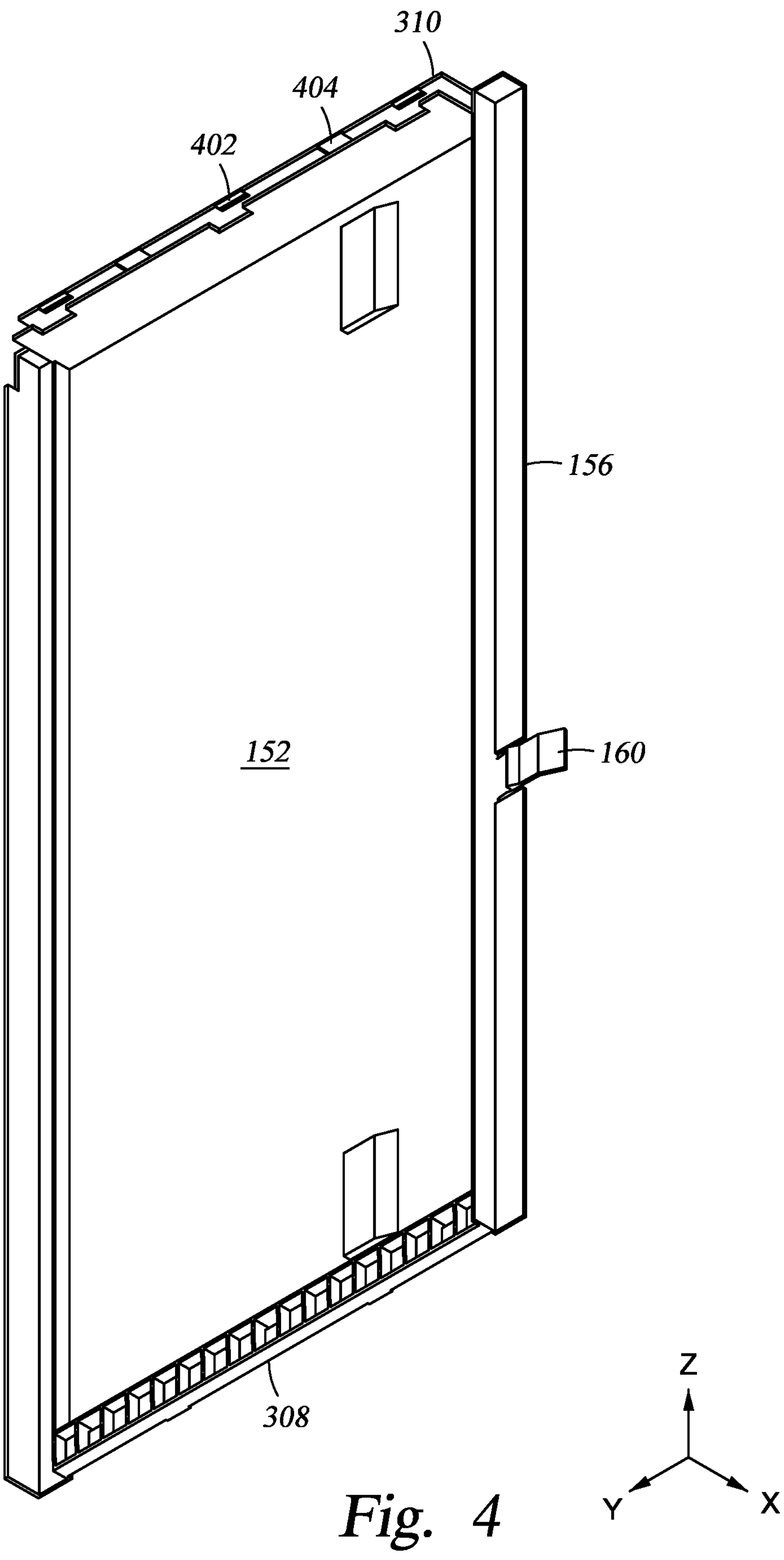
FIG. 4 illustrates a back perspective view of a panel of a filter extender.

Referring additionally to FIG. 6, the first end 310 of one panel 152 is shown receiving the second end 312 of an adjacent panel 152 such that the mating panels 152 are secured at a right angle. In one example, the first end 310 includes an outer lip 604 and an inner lip 606. The lips 604, 606 extend at a right angle from the inner surface 308 of the panel 152. The spaced lips 604, 606 are open to form a panel pocket 602 that is sized to receive the second end 312 of the mating adjacent panel 152. The second retaining features may be disposed on one or both of the lips 604, 606. In one example, the second retaining features 402 shown in FIG. 4 are disposed on the outer lip 604 and face the inner lip 606. The outer lip 606 may include a slot aligned with the second retaining features 402 that allows the second retaining features 402 to be more easily molded in the pocket side surface of the inner lip 606

Similarly, the first alignment features 302 may be positioned on the inner surface 308 and/or the outer surface 310 to engage with the second alignment features 404 that is positioned on one or both of the surfaces of the lips 604, 606 that face the pocket 602. In one example, the first alignment features 302 shown on in a recessed portion of the outer surface 306 in FIG. 3 are configured to slidingly engage with the second alignment features 404 shown in FIG. 4 that are disposed on the pocket side surface of the inner lip 606.

Figure 7:
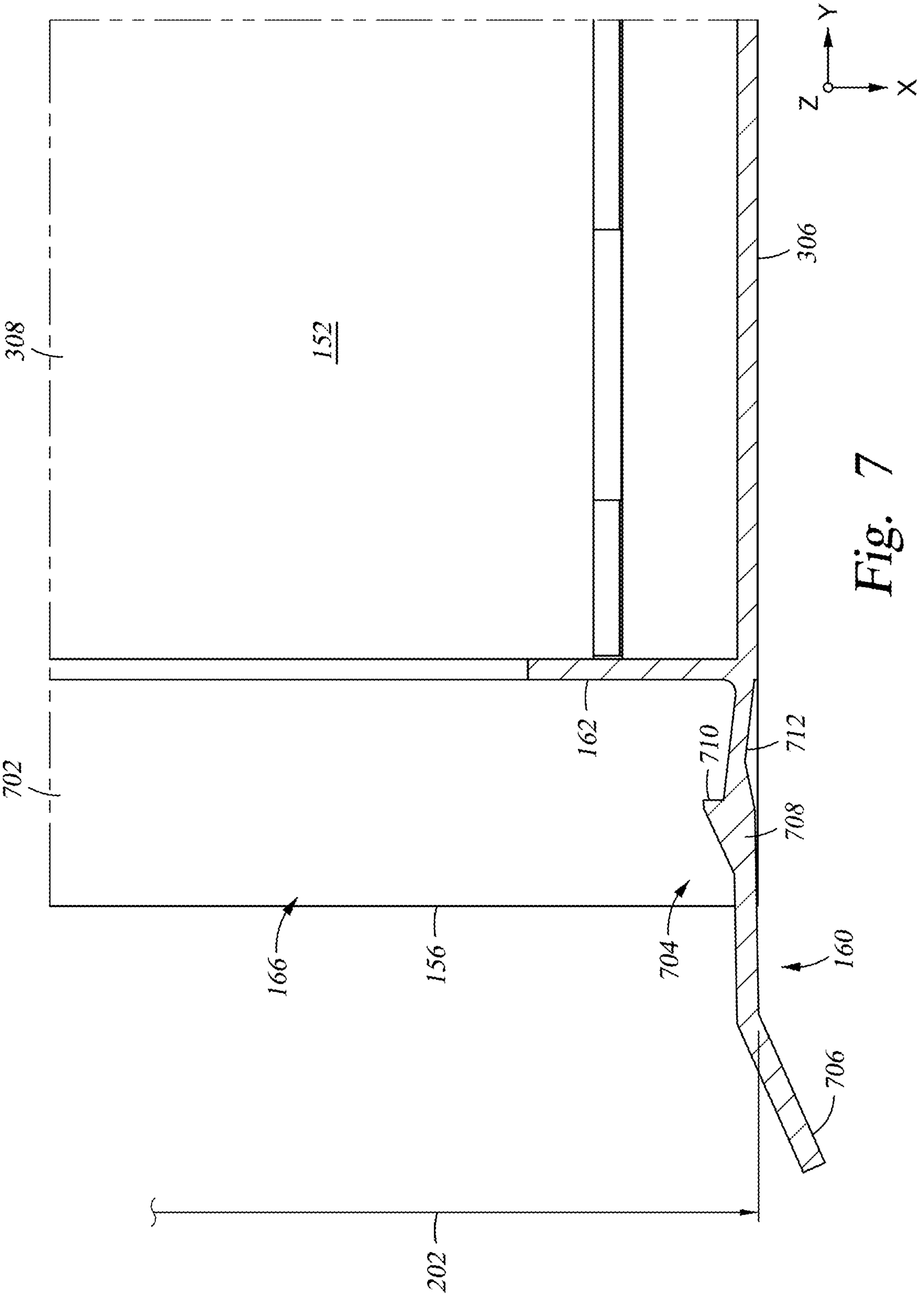
FIG. 7 illustrates another partial sectional view of a portion of one of the filter panels of the filter extender taken along section line 7-7 depicted in FIG. 5.

FIG. 7 is another partial sectional view of a portion of one of the filter panels 152 of the filter extender 150 taken along section line 7-7 depicted in FIG. 5. FIG. 7 more clearly details the area around the front edge 156 of the filter extender 150. A flange 702 is defined between the front edge 156 and the lip 162. The area within the filter extender 150 partially bounded by the flange 702 and the lip 162 form a filter receiving pocket 702.

FIG. 7 is another partial sectional view of a portion of one of the filter panels 152 of the filter extender 150 taken along section line 7-7 depicted in FIG. 5. FIG. 7 more clearly details the area around the front edge 156 of the filter extender 150. A flange 702 is defined between the front edge 156 and the lip 162. The area within the filter extender 150 partially bounded by the flange 702 and the lip 162 form a filter receiving pocket 704.

The clip 160 extends from the panel 156 beyond the front edge 156. The clip includes a tab 706, an arm 708 and a catch 710. The arm 708 is attached to the panel 156 in a manner that allows the arm 708 to be deflected away from the filter receiving pocket 704. The arm 708 may include a thinned portion 712 (relative to a thickness of the other portions of the clip 160 and/or thickness of the panel 152) that enhances the ability of the arm 708 to be deflected in a desired direction away from the filter receiving pocket 704. The arm 708 is resilient enough that once a force deflecting the arm 708 away from the filter receiving pocket 704, the arm 708 retains to its original position. The side of the arm 708 facing the filter receiving pocket 704 include the catch 710. The catch 710 is located on the arm 708 between the front edge 156 and the lip 162. The catch 710 generally projects from the arm 708 into the filter receiving pocket 704 in a direction substantially parallel to the lip 162, where the catch 710 can engage with recess 112 formed in the header 102 of the air filter 100 as later discussed with reference to FIG. 10. The catch 710 may be sloped to allow the clip 160 to be deflected upon insertion of the air filter 100 into the filter receiving pocket 704.

Figure 8:
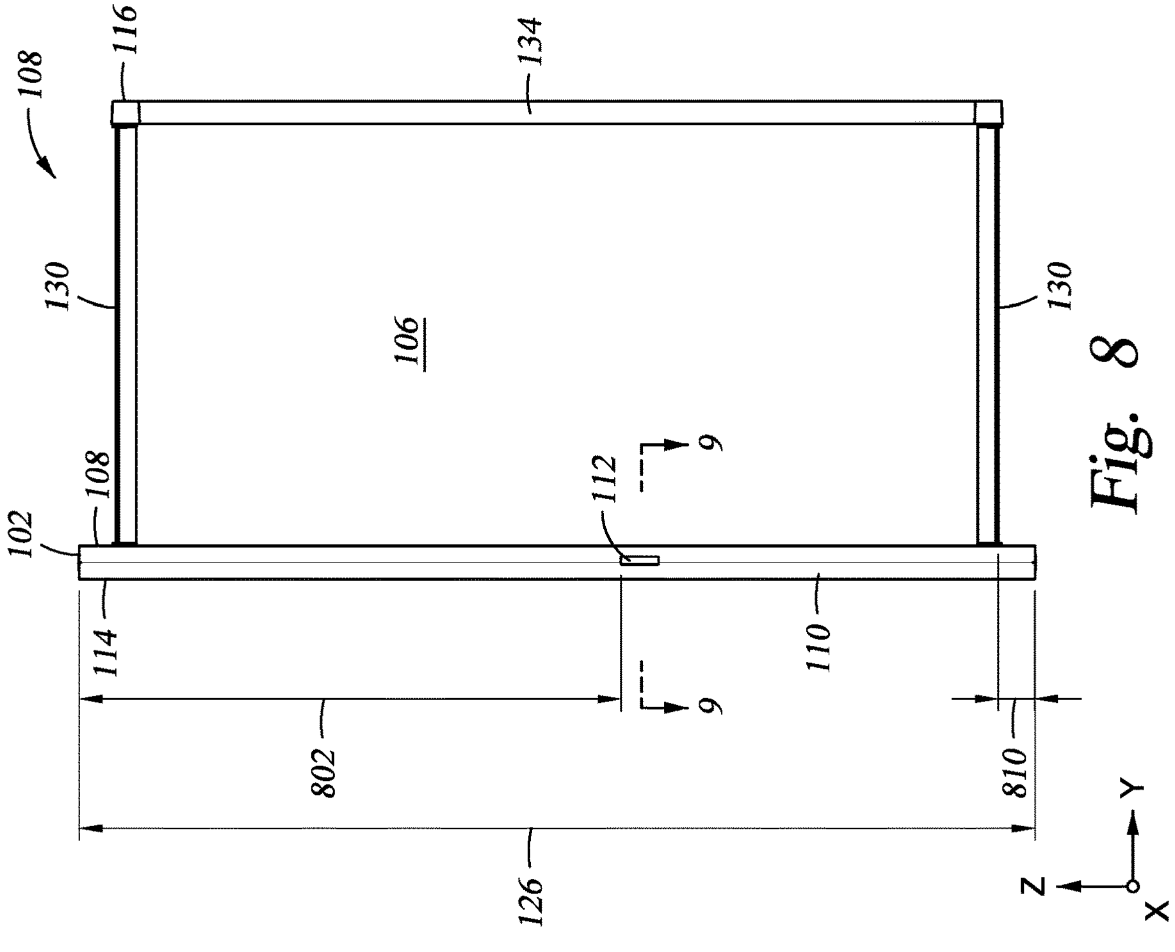
FIG. 8 illustrates a side view of an air filter that may be utilized with a filter extender.

FIG. 8 is a side view of the air filter 100 illustrating the location of the recess 112 on the side 110 of the header 102. The recess 112 is located in a position complimentary to the location of the clip 160 so that the catch 170 may selectively engage and disengage the recess 112 to hold the air filter 100 within the pocket 704 of the filter extender 150. The recess 112 is located along the each side 110 of the header 102 a distance 802 that is greater than half the height 126 (or width 124) of the header 102 (depending on the side of the header 102 being viewed). For example along the height 126 of the header 102, the entire recess 112 is located a distance 802 that is greater than half the height 126. The amount the recess 112 and clip 160 are offset from the center is about the same to allow the clip 160 to align with the recess 160 upon insertion of the air filter 100 into the filter extender 150.

Also depicted in FIG. 8 is that the back side 108 of the header 102 extends a distance 810 from the side panels 130 such the back side 108 and readily seat on the lip 162 as later shown in FIG. 10.

Figure 9:
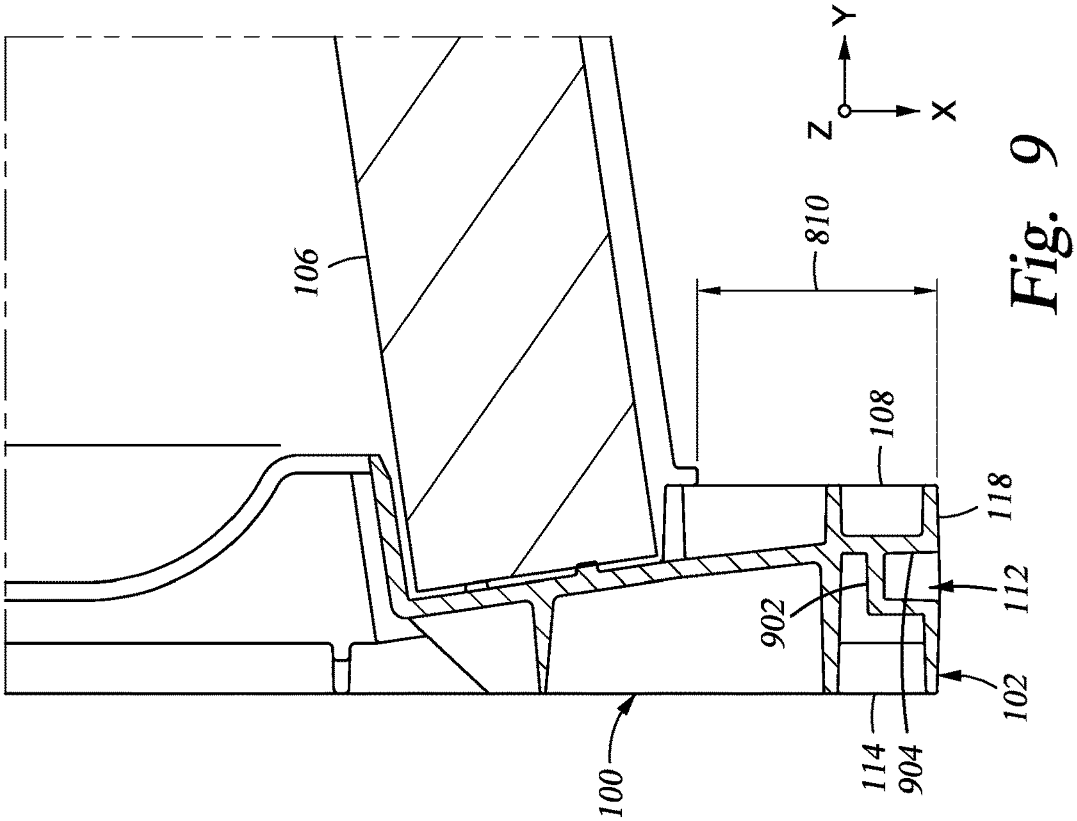
FIG. 9 illustrates a partial sectional view of a portion of one of the air filter taken along section line 9-9 depicted in FIG. 8.

Returning to the recess 112, the recess 112 is a blind feature formed in the side 110 of the header 102 as shown in the partial sectional view of the air filter 100 depicted in FIG. 9. The recess 112 generally includes a bottom 902 and sidewalls 904. The recess 112 is blind because the recess 112 is only open to exterior of the air filter 100 through the side 110 of the header 102. The blind recess 112 eliminates an air leak path around the air filter 100.

Figure 10:
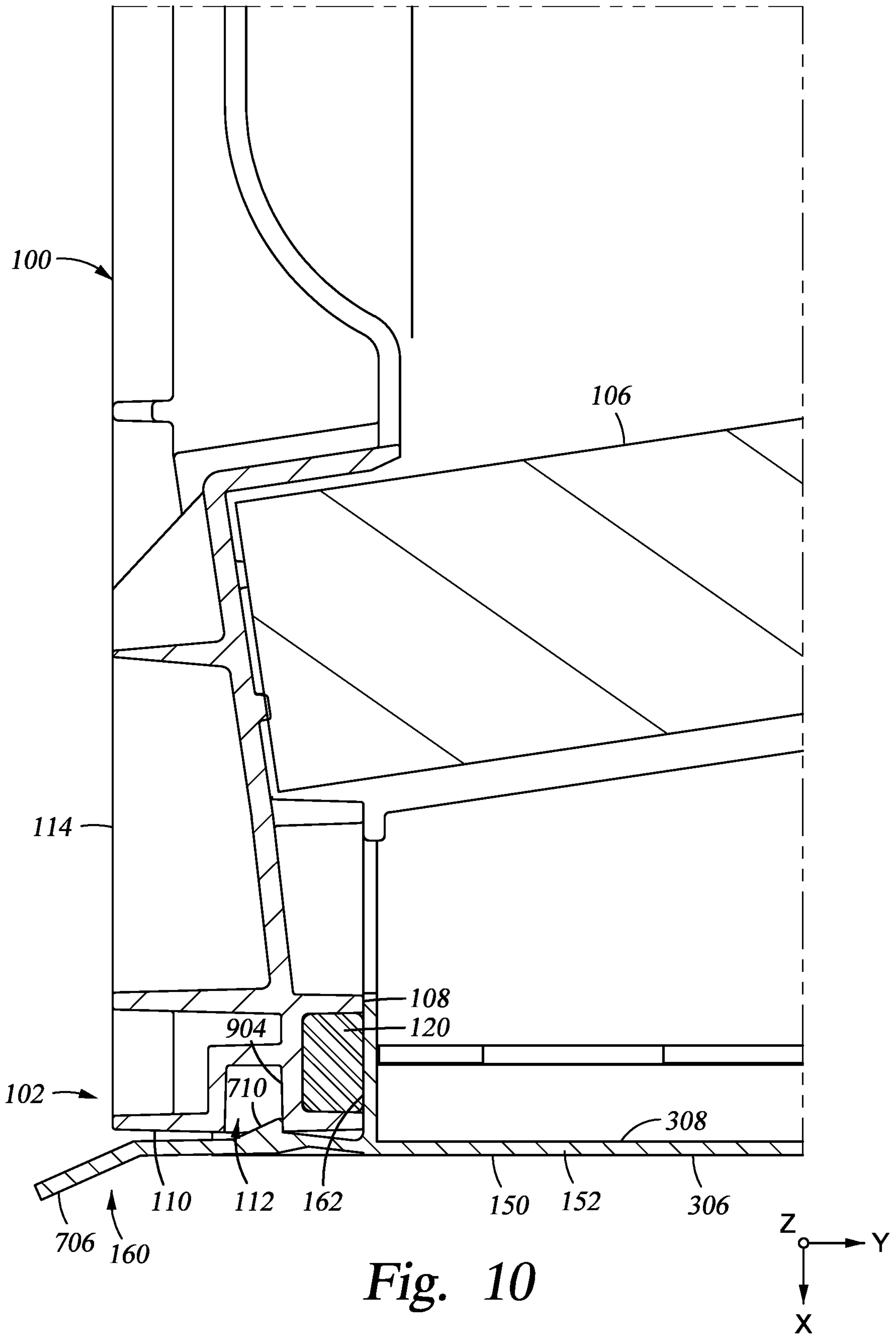
FIG. 10 illustrates a partial sectional view of a portion of an air filter mounted in a filter extender illustrating one example how the air filter is retained in the filter extender

FIG. 10 illustrates a partial sectional view of a portion of the air filter 100 mounted in a filter extender 150 illustrating one example how the air filter 100 is retained in the filter extender 150. As shown in FIG. 10, the catch 710 is engaged with the sidewall 904 of the recess 112 in a manner that prevents the air filter 100 from leaving the filter receiving pocket 704 of the filter extender 150 without deflection of the clip 150. The optional gasket 120 may be disposed between the back side 108 of the header 102 and the lip 162 such that the sidewall 904 of the recess 112 is biased by compressed gasket 120 against the catch 710.

Additionally illustrated in FIG. 10 is the flared tab 706 of the clip 160 allows the clip 160 to be accessed for deflection without interference from the air filter 100. The flared tab 706 of the clip 160 is not only laterally outward of the sides 110 of the header 102, but also extends beyond the front side 114 of the air filter 100. Since the flared tab 706 of the clip 160 is angled away and clear of the front side 114 of the air filter 100, the front side 114 of the air filter 100 can readily accept a pre-filter (not shown) that can be retained by spring clips interfacing with the recess 158 formed in the panel 150 of the filter extender 150.

Thus, a filter extender has been disclosed that may be shipped flat and readily assembled at an installation site. The filter extender may be formed by 4 identical panels, or two pairs of separately identical panels, thus reducing the amount of parts needed to be inventories. The filter extender also allows the use of pre-filters and different types of air filters. As the filter extender can be used to enclose portion of an air filter disposed upstream of a holding frame, the filters that could not normally be held partially or fully upstream of the holding frame now can be used in conjunction with the extender, thus, reducing the types of filters that need to be inventoried to satisfy different mounting requirements. Additionally, since the clips are offset from the centerline, the filter extender can be utilized in an array of filter holding frames without interfering with neighboring filters or extenders, While the foregoing is directed to certain embodiments, other and further embodiments may be devised without departing from the basic scope thereof, and the scope thereof is determined by the claims that follow.

We claim:

1. A panel for filter extender, comprising:

a first end having a male engagement feature;

a second end having a female engagement feature, the first end having an orientation parallel with the second end, the first and second ends defining opposite ends of the panel;

a back edge connecting the first and second ends;

a front edge connecting the first and second ends, the back edge having an orientation parallel with the front edge, the back and front edges defining opposite edges of the panel;

an outer surface of the panel bounded by the front and back edges and the first and second ends, the outer surface defining a plane that includes the front edge of the panel; and a clip extending from the front edge in a direction away from the back edge to a distal end, the distal end disposed on a side of the panel opposite the back edge, the clip integral to the panel, the entire clip offset from a centerline bifurcating the first and second edges.

2. The panel of claim 1, wherein the male engagement feature of the first end is configured to engage a female engagement feature of a second end of an identical panel.

3. The panel of claim 1, wherein the front edge further comprises a lip that extends perpendicular to the plane of the outer surface of the panel.

4. The panel of claim 3, wherein the clip further comprises:
- an arm extend from the front edge; and
- a catch spaced from the front edge by the arm, the catch oriented in a direction away from the outer surface of the panel.

5. The panel of claim 4, wherein the arm further comprises:
- a portion thinned relative to other portions of the clip that allows the clip to deflect from an original position upon engagement with a filter and return to the original position once force applied to the clip is removed.

6. The panel of claim 4, wherein the clip further comprises:
- a tab coupled to the catch, the tab disposed at an angle outward relative to the plane of the outer surface of the panel.

7. The panel of claim 1 further comprising:
- one or more recesses formed in the outer surface of the panel that is bounded by the front and back edges.

8. The panel of claim 1 further comprising:
- a lip extending perpendicular and away from the outer surface, the lip recessed from the front edge, wherein the back edge has a surface that is parallel to the lip.

9. The panel of claim 1, wherein the female engagement feature is configured to retain another identical panel at a right angle to the panel.

10. A filter extender, comprising:
- a first panel having a first end and a second end connected by front and back edges, the first and second ends of the first panel having a parallel orientation, the first and second edges of the first panel having a parallel orientation;
- a second panel having a first end and a second end connected by front and back edges, the first and second ends of the second panel having a parallel orientation, the first and second edges of the second panel having a parallel orientation;
- a third panel having a first end and a second end connected by front and back edges, the first and second ends of the third panel having a parallel orientation, the first and second edges of the third panel having a parallel orientation; and
- a fourth panel having a first end and a second end connected by front and back edges, the first and second ends of the fourth panel having a parallel orientation, the first and second edges of the fourth panel having a parallel orientation, the panels connected to form a hollow, each first edge of the first, second, third and fourth panels comprising:
  - an outer surface of the panel bounded by the front and back edges and the first and second ends, the outer surface defining a plane that includes and is parallel with the front edge of the panel; and
  - a clip extending from the front edge in a direction away from the back edge to a distal end, the distal end disposed on a side of the panel opposite the back edge, the clip integral to the panel, the entire clip offset from a centerline bifurcating the first and second edges.

11. The filter extender of claim 10, wherein the first, second, third and fourth panels are identical.

12. The filter extender of claim 10, wherein the first and second panels are identical, the third and fourth panels are identical, and the first and third panels are have different lengths.

13. The filter extender of claim 10, wherein each of the panels comprise:
- a male feature disposed at the first end and a female engagement feature disposed at the second end, wherein the male and female engagement features of each panel are identical, and wherein the male and female engagement feature engage to hold adjacent panels perpendicular to each other.

14. The filter extender of claim 10, wherein the front edge of each panel further comprises a lip that extends perpendicular to the plane of the outer surface of the panel bounded by the front and back edges.

15. The filter extender of claim 14, wherein each of the clips further comprises:
- an arm extend from the front edge; and
- a catch spaced from the front edge by the arm, the catch oriented in a direction substantially parallel to the lip.

16. The filter extender of claim 15 further comprising:
- an air filter disposed in the filter extender, each side of the air filter having a recess, the entire recess offset from a centerline bifurcating opposite sides of the air filter, each recess receiving a respective one of the clips.

17. The filter extender of claim 15, wherein the clip further comprises:
- a tab coupled to the catch, the tab disposed at an angle outward relative to the plane of the outer surface of the panel.

18. The filter extender of claim 10, wherein each panel further comprising:
- a lip extending perpendicular and away from the outer surface, the lip recessed from the front edge, wherein the back edge has a surface that is parallel to the lip.

19. The filter extender of 10, wherein the panels are snap fit together.

20. A stacked array of filter extenders comprising at least a first extender configured as the filter extender of claim 10, and a second filter extender configured identical to the first filter extender, wherein clips are facing panels of the adjacent filter extenders are on opposite sides.

21. A panel for filter extender, comprising:
- a first end having a male engagement feature;
- a second end having a female engagement feature, the first and second ends having a parallel orientation and disposed at opposite ends of the panel;
- a back edge connecting the first and second ends;
- a front edge connecting the first and second ends, the first and second edges having a parallel orientation and disposed at opposite edges of the panel, the front edge further comprising a lip that extends perpendicular to a plane of an outer surface of the panel bounded by the front and back edges and the first and second ends;
- a clip extending from front edge in a direction away from the back edge, the clip integral to the panel, the entire clip offset from a centerline bifurcating the first and second edges, the clip having an arm comprising a portion thinned relative to other portions of the clip that allows the clip to deflect from an original position upon engagement with a filter and return to the original position once force applied to the clip is removed; and
- a catch spaced from the front edge by the arm, the catch oriented in a direction away from the outer surface of the panel.

* * * * *